United States Patent [19]

Gurley

[11] Patent Number: 5,245,434
[45] Date of Patent: Sep. 14, 1993

[54] AUTOPIX CIRCUIT WITH INSERTED VERTICAL BLANKING

[75] Inventor: Thomas D. Gurley, Indianapolis, Ind.

[73] Assignee: Thomson Consumer Electronics, Inc., Indianapolis, Ind.

[21] Appl. No.: 887,745

[22] Filed: May 22, 1992

[51] Int. Cl.$^5$ .............................................. H04N 5/20
[52] U.S. Cl. .................................... 358/169; 358/74; 358/174
[58] Field of Search ................. 358/169, 168, 165, 27, 358/174, 176, 177, 178, 39, 40, 74, 65

[56] References Cited

U.S. PATENT DOCUMENTS

| | | | |
|---|---|---|---|
| 4,386,369 | 5/1983 | Shanley, II et al. | 358/166 |
| 4,554,578 | 11/1985 | Willis | 358/74 |
| 4,587,554 | 5/1986 | Tamura et al. | 358/169 |
| 4,937,670 | 6/1990 | Whitledge | 358/160 |
| 4,947,253 | 8/1990 | Neal | 358/169 |
| 4,980,756 | 12/1990 | Lagoni | 358/39 |
| 5,003,394 | 3/1991 | Lagoni | 358/168 |

OTHER PUBLICATIONS

TA7730 available from Toshiba Corporation.
Description of "Black Level Correction (Dynamic Black) Circuit", from Operation Manual of G7U Television Receiver.
Sony CX20125 Application Note and Translation.

*Primary Examiner*—James J. Groody
*Assistant Examiner*—David E. Harvey
*Attorney, Agent, or Firm*—Joseph S. Tripoli; Peter M. Emanuel

[57] ABSTRACT

A TV system includes a selectively enabled blanking network for introducing blanking into the autopix feedback loop during vertical blanking periods. The TV system includes a contrast control section responsive to color signals whose output is coupled to a brightness control section. Outputs of the brightness control section are combined via a combining means to produce a "combined signal" representative of the luminance component of the image to be displayed. The "combined signal", which is not "blanked" during the vertical blanking (retrace) period, is coupled via a feedback loop which includes a peak detector and a comparator to the input of the contrast control section for controlling its response to the color signals. The selectively enabled blanking network is coupled to the input of the peak detector in the feedback loop for limiting the propagation of the "combined signal" via the feedback loop during vertical blanking intervals.

10 Claims, 4 Drawing Sheets

AUTOPIX CIRCUIT WITH INSERTED VERTICAL BLANKING

FIELD OF THE INVENTION

This invention relates to an arrangement for controlling the contrast of a television receiver or monitor and, in particular, to an arrangement for automatic contrast control of a television receiver or monitor.

BACKGROUND OF THE INVENTION

In modern television systems it is known to automatically control the contrast and brightness of a reproduced image. For example, a TV system with automatic contrast control to inhibit "white spot blooming" is described in U.S. Pat. No. 5,003,394 entitled DYNAMIC VIDEO SYSTEM INCLUDING AUTOMATIC CONTRAST AND "WHITE STRETCH" PROCESSING SECTIONS issued to William A. Lagoni and assigned to the assignee of this application. Another TV system which includes automatic contrast control is described in U.S. Pat. No. 5,204,748 titled BEAM CURRENT LIMITING ARRANGEMENT FOR TELEVISION SYSTEM WITH PICTURE-IN-PICTURE PROVISIONS issued to William A. Lagoni and assigned to the assignee of this application and whose teachings are incorporated herein by reference. Automatic contrast control (which is also referred to as "autopix" where "pix" is an abbreviation for "picture") prevents loss of detail sharpness in highlight (white) areas due to blooming, while permitting high contrast (and therefore subjectively bright) images when the signal peaks remain below the blooming threshold.

Automatic contrast control circuitry used in modern TV systems is shown in FIG. 1. [For purpose of clarity only those portions of a TV system deemed pertinent to a discussion of the invention are shown in FIG. 1. A more detailed description of the TV systems is presented in the references cited above.] Referring to FIG. 1, there is shown main and auxiliary video inputs 1 and 3, respectively, coupled to a picture-in-picture (PIP) processor 5 which is also controlled by a receiver control 7. PIP processor 5 provides signals (C and Y) to luminance circuit 9 and to chrominance circuit 11. The outputs of luminance and chrominance circuits 9 and 11, respectively, are applied to a matrix 10 whose outputs are red(r), blue(b), and green(g) color signals which are applied to respective inputs of contrast control section 13r, 13b, and 13g. The contrast control section (e.g., 13r, 13b and 13g) is responsive to the red (r), blue (b) and green (g) color signals and its outputs are applied to a brightness control section (e.g. 15r, 15b and 15g) whose outputs are coupled via drivers (e.g. 17r, 17b and 17g) to a picture tube (e.g. 19).

The automatic contrast control arrangement includes a combiner circuit 47 for deriving a "combined" signal (e.g., SUMY) from the ouputs of the brightness section. The combined signal (i.e., SUMY) as used herein and in the claims appended hereto is representative of the luminance component of the displayed image. The combined signal (SUMY) is then processed via a peak detector 49 and a comparator 50 whose output is fed back via a buffer 51 to the control input of the contrast control section (13r, 13b, 13g) of the TV system. The autopix loop comprising peak detector 49, comparator 50, and buffer 51 defines a feedback loop coupled between the output (terminal 14) of the combiner circuit 47 and the input control (terminal 13) of the contrast control section which determines the gain of the contrast control section.

It should be noted that the matrix 10, the contrast control section 13r, 13b and 13g, the brightness control section 15r, 15b and 15g, and the combiner circuit 47 are all formed on the same integrated circuit (IC) which may be, for example, a TA7730 available from the Toshiba Corporation. As a result of the circuitry being formed on an IC the inputs to the IC and the outputs from the IC are predefined and are not easily modified.

A problem with the TV system of the type shown in FIG. 1 is that any instability associated with the autopix feedback loop may cause disturbances (e.g. flutter) in the image displayed on the picture tube.

In fact, such a problem was noted in the operation of TV systems containing circuitry of the type shown in FIG. 1 in that there was observed intermittent fluttering of the image displayed by picture tube 19 during several different modes of operation. For example, while making use of the features available with the PIP system, fluttering was seen during the shifting, freezing, expanding and contracting of the small picture and during the expanding, shifting, freezing and zooming of the large picture.

Applicant recognized that the problem was not due to a suspected instability in the autopix feedback loop. Rather, Applicant recognized that the combined output signal (SUMY) was not "blanked" during vertical retrace and contains extraneous and unwanted signals which are injected into the autopix feedback loop during vertical blanking (retrace) periods and that it is these signals which caused the observed flicker.

Applicant also recognized that since the the combined output signal (SUMY) is produced within the IC, the combined signal produced on the chip can not be easily or readily altered without modification of the IC.

SUMMARY OF THE INVENTION

Applicant's invention resides, in part, in the recognition of the source of the problem, described above, and in circuitry for rectifying the problem.

In TV systems embodying the invention, circuitry is coupled to the contrast control (autopix) feedback loop for limiting the propagation of the combined signal during vertical blanking periods.

The propagation of the combined signal via the autopix feedback loop is limited (attenuated and/or inhibited) without significantly disrupting the signals at the output of the loop.

In a particular embodiment, during vertical blanking intervals, the combined signal which is normally applied to the input of a peak detector is significantly attenuated whereby the peak detector does not respond or responds minimally to the combined signal. Consequently, the output of the peak detector and the output of the autopix feedback loop change very little during the vertical blanking interval.

BRIEF DESCRIPTION OF THE DRAWING

In the accompanying drawing like reference characters denote like components.

DETAILED DESCRIPTION OF THE INVENTION

Figure 1:
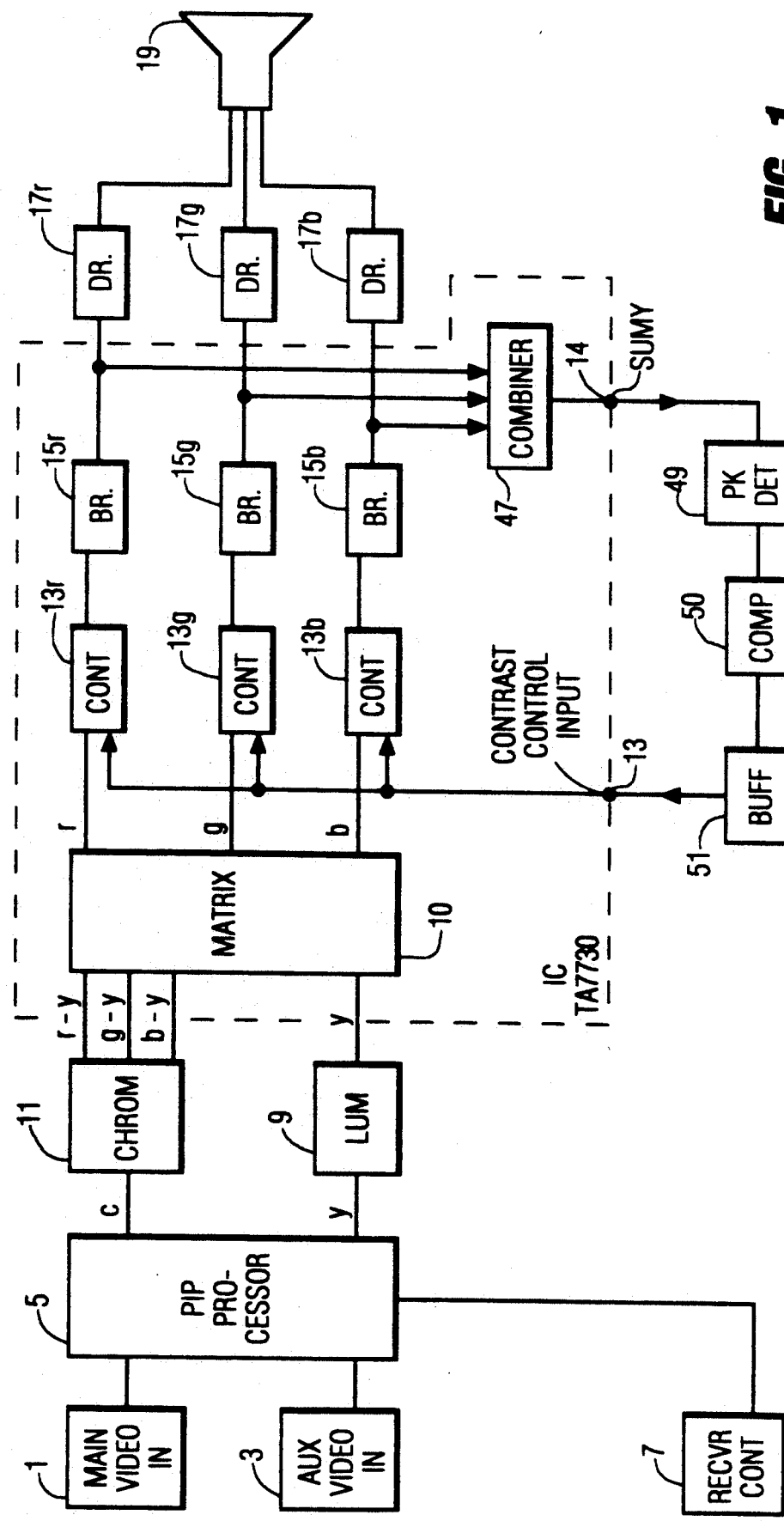
FIG. 1 is a block diagram of a portion of a prior art TV system.
Figure 2:
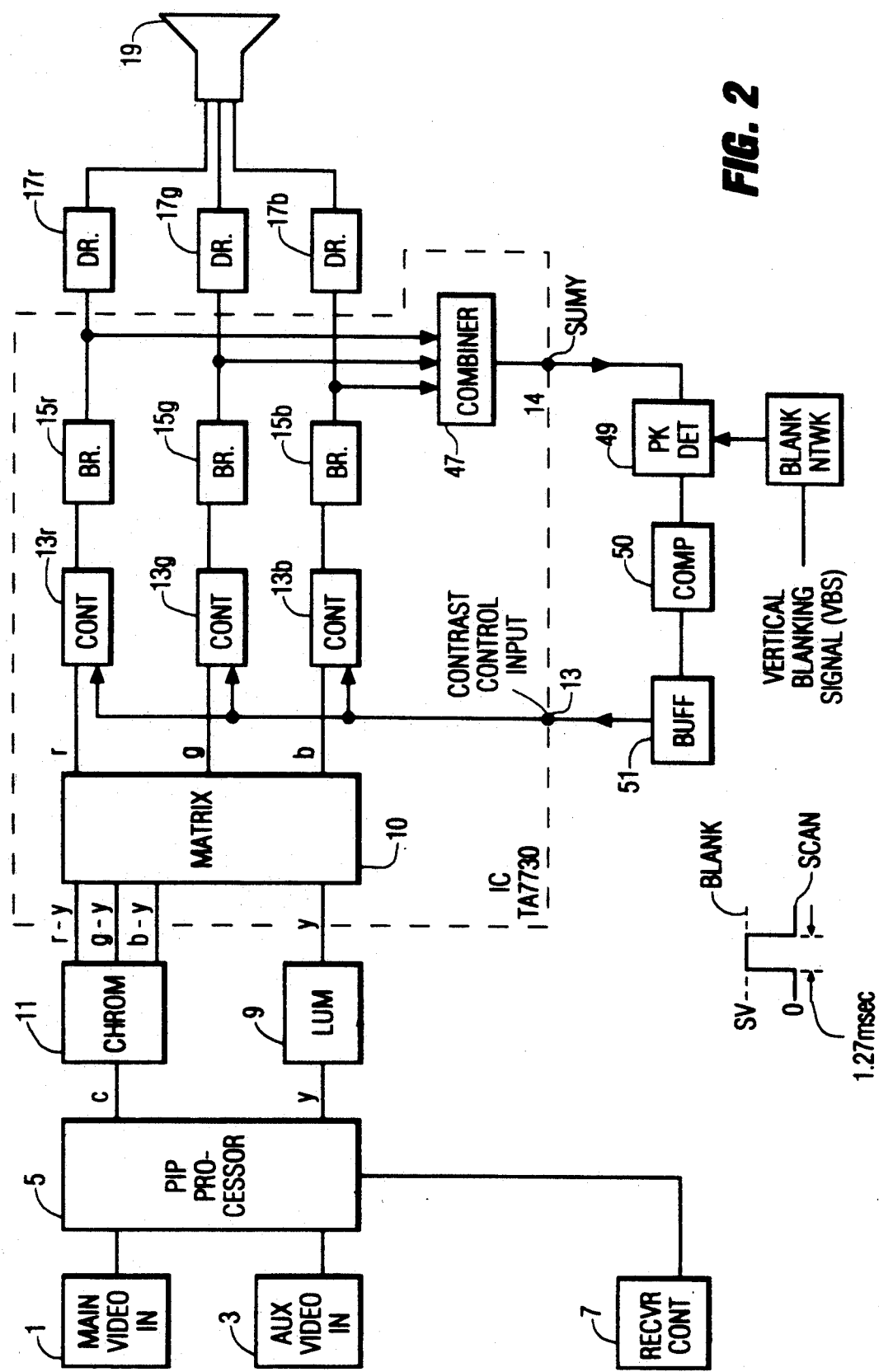
FIG. 2 is a block diagram of a portion of TV system in accordance with the invention.

A TV system embodying the invention is shown in FIG. 2. The system of FIG. 2 is identical to the TV system of FIG. 1 except that in FIG. 2 there is coupled to the peak detector 49 a blanking circuit 108 which is driven by a vertical blanking signal. Peak detector 49 may be of the type described in U.S. Pat. No. 4,937,670 entitled PEAK DETECTOR WITH FEEDBACK issued to G. A. Whitledge and assigned to the assignee of the present application and whose teachings are incorporated herein by reference. Such a peak detector has a relatively quick charge up time and a relatively long discharge time constant. That is, peak detector 49 is of the type which will respond relatively quickly to a "peak" signal (i.e., an input signal of greater amplitude than the value it is storing) and which will retain that value for a relatively long period of time. As detailed below, when a vertical blanking signal is present, the control circuit 108 is activated and the SUMY signal applied to the input of the peak detector 49 is significantly attenuated. Consequently, the peak detector either does not respond or responds minimally to the value of the SUMY signal applied to it during the vertical blanking period. Thus, by significantly attenuating signals applied to the input of the peak detector during a vertical blanking interval, its output will tend to remain at a relatively constant value throughout the vertical blanking interval. As a result, changes appearing as part of the SUMY signal will not be transmitted along the feedback loop during the vertical blanking interval.

This and other features of the invention are better explained with reference to FIG. 3, in which blanking circuit 108, peak detector 49, comparator 50 and buffer 51 are detailed schematically and with reference to the waveforms shown in FIG. 4.

Figure 3:
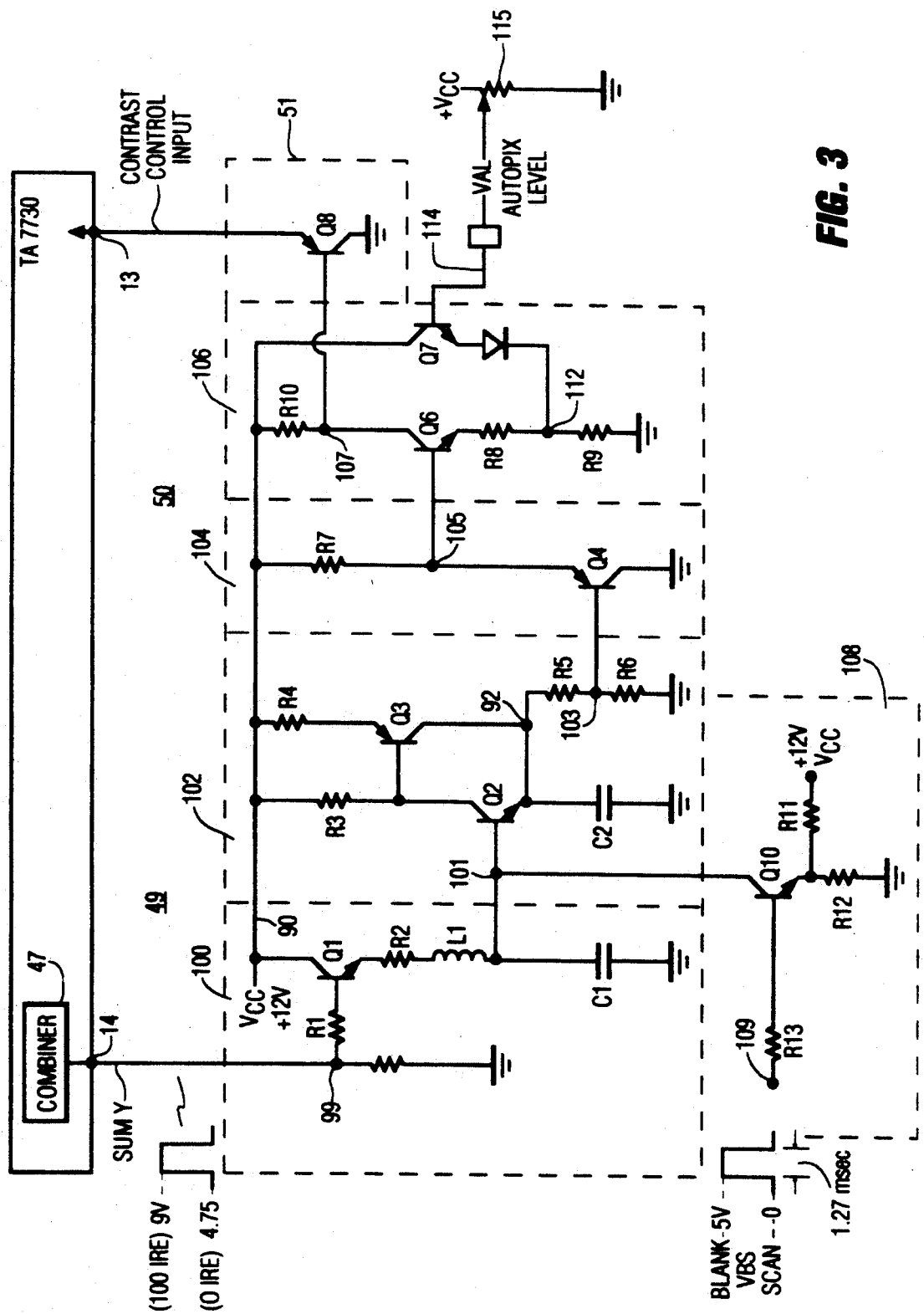
FIG. 3 is a schematic diagram of circuitry embodying the invention.

Referring now to the circuit of FIG. 3 there is shown a terminal 14 at which is produced the "combined" signal denoted as SUMY. The SUMY signal may appear as a pulse having a maximum amplitude of approximately 4.25 volts riding on a pedestal of aproximately 4.75 volts. The SUMY signal is coupled via an emitter follower stage 100 to a peak detector stage 102 whose output is coupled via an emitter follower stage 104 to the input of a comparator stage 106. The output of the comparator 106 controls the conductivity of a contrast control transistor Q8. Stages 100 and 102 correspond generally to the peak detector 49 in FIG. 2, stages 104 and 106 correspond generally to comparator 50 and Q8 corresponds to buffer 51 of FIG. 2. In FIG. 3, the autopix blanking circuit 108 is connected at the input of peak detector 102 to apply a "blanking" signal to the autopix loop during the vertical blanking interval. As detailed below, blanking circuit 108 functions to attenuate and inhibit the SUMY signals applied to the peak detector 102 during vertical blanking intervals.

Terminal 14, at which the SUMY signal is available, is connected to the input 99 of emitter follower stage 100. Emitter follower stage 100 includes a resistor R1 connected between input node 99 and the base of an NPN bipolar transistor Q1 whose collector is connected to a power terminal 90 to which is applied a potential of VCC volts, which may be, for example, a positive 12 volts. The emitter of Q1 is connected via the series combination of a resistor R2 and a choke L1 to a node 101. A capacitor C1, which together with L1 provides filtering action, is connected between node 101 and ground. Node 101, which serves as the output of stage 100, is connected to the input of peak detector 102. Peak detector stage 102 includes an NPN bipolar transistor Q2 connected at its base to node 101, and at its collector to the base of a PNP transistor Q3 and to one end of a resistor R3. The other end of R3 is connected to power terminal 90 and the emitter of Q3 is coupled via a resistor R4 to terminal 90. Q2 is connected at its emitter to a node 92 to which is also connected the collector of Q3, one end of a resistor R5 and one plate of a capacitor C2. The other plate of capacitor C2 is returned to ground potential. Resistor R5 is connected between nodes 92 and 103 and a resistor R6 is connected between node 103 and ground. The output of peak detector 102 present at node 103 is connected to the input of emitter follower stage 104. Emitter follower stage 104 includes a PNP transistor Q4, operated as an emitter follower, whose base is connected to node 103, whose collector is grounded, and whose emitter is connected to node 105, which serves as the output node of the stage. A resistor R7 is connected between node 105 and terminal 90. Node 105 is connected to an input (base of Q6) of comparator stage 106. Comparator stage 106 includes an NPN transistor Q6 connected at its base to node 105, at its collector to an output node 107 and at its emitter via a resistor R8 to a node 112. A resistor R9 is connected between node 112 and ground and a load resistor R10 is connected between the collector of Q6 at output node 107 and power terminal 90. Comparator 106 also includes an NPN transistor Q7 connected at its emitter via a diode D1 to node 112, at its collector to power terminal 90, and at its base to a bias point 114 to which is applied a bias voltage denoted herein as VAL. VAL is the autopix level voltage and is adjusted (e.g., via automatic test equipment at the factory) to control the comparison level for autopix action. The voltage (VAL) at the base of Q7 is set by means of a rheostat 115 to control the value (threshold) at which the autopix loop serves effectively as a peak white limiter. Output node 107 of comparator 106 is connected to the input (base) of a PNP trasistor Q8 which is referred to herein as the contrast control transistor and which functions as a variable resistor to vary the voltage and current into terminal 13.

If VAL is set at, or close to, +12V, Q7 will always keep Q6 turned-off and transistor Q8 will always be turned-off. When Q8 is turned off there is no feedback via the autopix loop and there is no control or attenuation of the open loop gain of the contrast control section. If VAL is set low (at, or close to, zero volts) the autopix would allow constant and continuous feedback control. The value of VAL is normally set to a value which causes the maximum amplitude of the SUMY signal at terminal 14 to be approximately equal to 3.5 volts.

Blanking circuit 108 includes an NPN bipolar transistor Q10 connected at its collector to node 101 and at its emitter to one end of resistors R11 and R12. The other end of resistor R11 is returned to VCC and the other end of R12 is returned to ground. Resistors R11 and R12 function as a voltage divider to establish the emitter voltage of Q10. The base of Q10 is connected via a resistor R13 to an input terminal 109 to which is applied a vertical blanking signal (VBS).

In the normal operation of the circuit of FIG. 3, the SUMY signal present at terminal 14 is coupled via emitter follower Q1 and R2 to the base of Q2. It may be assumed that the SUMY signal less one VBE drop (i.e. the base-to-emitter drop of Q1) is applied to the base of Q2. As detailed in U.S. Pat. No. 4,937,670 to Whitledge, Q2 in combination with Q3 functions to charge capacitor C2 very quickly to a value equal to the SUMY voltage less two VBE drops (i.e. the base-to-emitter drops of Q1 and Q2). Note that C2 may be, for example, equal to 10 microfarads and that resistors R5 and R6 may have values of aproximately 30k ohms and 70k ohms, respectively. The discharge time constant of the C2-R5-R6 network is thus approximately equal to one second. Consequently, node 92 charges up very quickly (via Q1, Q2 and Q3) to the value of SUMY (less 2VBE) but discharges relatively slowly. Resistors R5 and R6 function as a voltage divider so that approximately 70% of the voltage at node 92 is present at node 103. The voltage at node 103 is applied to the base of emitter follower transistor Q4 which functions to reproduce at node 105 the voltage at node 103 while level shifting the signal up by the VBE of Q4. The voltage at the emitter of Q5 is then applied to the base of Q6 whose voltage is compared to the bias voltage (VAL) applied to the base of Q7.

When the voltage at the base of Q6 exceeds the voltage at the base of Q7 (minus one VBE due to diode D1), Q6 conducts and causes current to flow through R10 and out of the base of Q8. The base current out of Q8 is amplified causing an emitter-to-collector current to flow through Q8. An increased current through Q8, which is operated as an emitter follower, reduces the contrast voltage level which then adjusts (reduces the gain of the TA7730 chip) the contrast signals propagated in the TA7730 chip and alters (reduces) the amplitude of the SUMY signal seen at terminal 14.

As noted above, in the absence of circuitry embodying applicant's invention, intermittent fluttering of the picture was noted in TV systems incorporating the circuitry discussed above. Applicant recognized that the flutter problem observed in TV systems employing the TA7730 chip was not due to instability of the autopix loop. Rather, Applicant recognized that the problem was due to unwanted signals present in the SUMY signal during blanking intervals, such as the vertical blanking interval. That is, the SUMY signal is not blanked during the vertical blanking (retrace) intervals. Applicant recognized that during the vertical blanking intervals, there are signals present at the SUMY output terminal 14 which are not related to the contents of the picture being displayed. These signals, when injected into the loop, can cause a change in the contrast level control which is not in keeping with the picture being displayed on tube 19, thereby causing the seemingly erratic functioning of the autopix loop.

Accordingly, the invention is directed to circuitry for preventing the injection of signals into the autopix loop occurring during the vertical blanking interval. This is accomplished by the addition of blanking network 108 in the autopix loop. The blanking network is enabled in response to the application of an input signal denoted as a "vertical blanking signal" (VBS) to the base of NPN transistor Q10. The VBS signal (available at an input of the TA7730 IC) includes a pulse which switches from 0 volts to 5 volts during each vertical blanking interval. The VBS signal is normally at zero volts for which condition the autopix "blanking" transistor Q10 is turned off and does not affect or load the autopix circuit. When the VBS signal is "high" (i.e. at, or close to, 5 volts) it turns on transistor Q10 which is rendered conductive when the voltage at its base exceeds the voltage at its emitter. The voltage at the emitter of Q10 is set by resistors R11 and R12 which form a divider network. In a particular embodiment R11 was selected to be 820 ohms and resistor R12 was selected to be 390 ohms to produce a voltage of approximately 3.8 volts at the emitter of Q10. For this condition, Q10 is turned on when the voltage at its base is a VBE above 3.8 volts and is turned off when the voltage applied to its base voltage is below that level. Thus, when VBS is "low" (i.e. 0 volts) Q10 is turned-off and when VBS is "high" (i.e. 5 volts) Q10 is turned-on.

The blanking network 108 was designed to ensure that, when Q10 is turned on hard, the base of Q2 (the input of peak detector 102) is brought down to some minimum voltage (VMIN) rather than ground. In the embodiment of FIG. 3, VMIN is approximately equal to 3.86 volts. Since the maximum voltage at the emitter of Q2 is close to 8 volts, maintaining the base of Q2 at the minimum voltage of VMIN (e.g., 3.86 volts) prevents Q2 from breaking down and/or being excessively reverse biased.

As to its effect on the signal SUMY, the turn-on of Q10 functions to attenuate the input signals coupled via Q1 to the base of Q2 and to lower the pedestal on which the signal rides. Thus, the attenuated signals may not have sufficient amplitude to cause conduction of Q2 and hence, will be inhibited. The actual function performed depends on the amplitude of the input SUMY signal and on the value of the peak signal previously detected and being stored at node 92, across C2, at the emitter of Q2.

When Q10 turns on, the signal coupled via Q1 is significantly attenuated since Q10 functions to couple a low impedance resistor between node 101 and ground. For example, where R11 and R12 are equal to 820 and 390 ohms, respectively, the equivalent impedance (Ra) in the emitter circuit of Q10 which is equal to (R11×R12)/(R11+R12) may be calculated to be approximately 260 ohms. When Q10 turns-on, the signal (SUMY−VBE) at the emitter of Q1 is attenuated by a ratio which is approximately equal to Ra/(Ra+R2) when applied to the base of Q2 at node 101. When R2 is in the order of 1K ohms and Ra is in the order of 260 ohms, the attenuation ratio is approximately 260/1260=0.2. The SUMY signal at the emitter of Q1 may thus be attenuated by a factor of approximately five when coupled to the base of Q2.

Figure 4A:
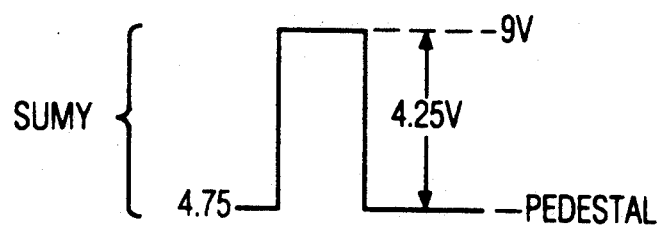
FIG. 4a–4c are diagrams of waveforms associated with the circuit of FIG. 3.
Figure 4B:
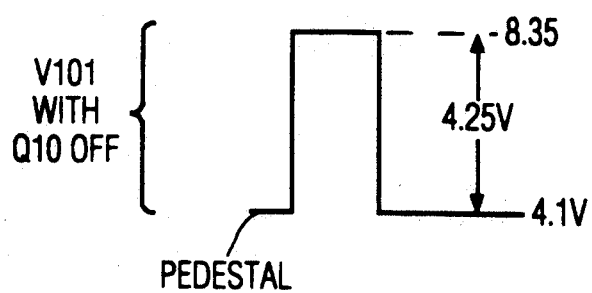
Figure 4C:
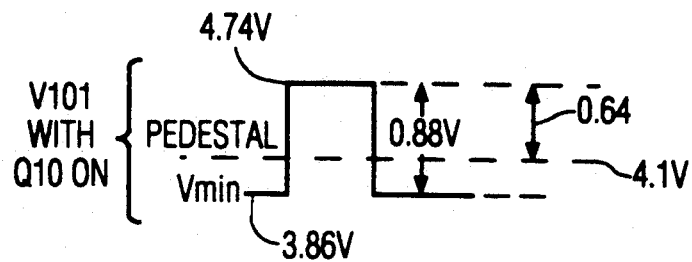

The attenuation of the SUMY signal and the lowering of the pedestal may be best explained with reference to the waveform diagrams of FIG. 4. For example, assume that, as shown in FIG. 4A, the SUMY signal at terminal 14 is a pulse having a maximum amplitude of 4.25 volts riding on a pedestal of 4.75 volts. In normal operation, as shown in FIG. 4B, the voltage at node 101 (V101) resulting from the SUMY signal will be a pulse having a maximum amplitude of (approximately) 4.25 volts riding on a pedestal of (approximately) 4.1 volts. When Q10 is turned-on, the pedestal (i.e. the dc level) at node 101 is lowered to VMIN and the signal amplitude is attenuated as shown in FIG. 4C. For the values of R2, R11 and R12, discussed above, and for the maximum SUMY signal of FIG. 4A, the pedestal (i.e. the dc level) at node 101 goes from 4.1 volts to a VMIN of 3.86 volts and the maximum amplitude of the signal pulse would be 0.88 volts above that. Since the "normal" pedestal at node 101 is 4.1 volts, it is evident that turning-on Q10 of the "blanking" circuit 108 lowers (or shifts down) the dc level of the pedestal and the signal riding on the pedestal. Thus, assuming SUMY to be at its maximum level, a maximum signal of 0.64 volt would be available at node 101 for propogation via peak detector 102 during vertical blanking. It should also be appreciated that a zero volt signal condition riding on a 4.1 volt pedestal represents the extreme "black" condition. Thus, the emitter of Q2 will normally be charged to a level which corresponds to a voltage at the base of Q2 greater than 4.1 volts. That is, the emitter of Q2 may be charged to a voltage of 4 to 5 volts and a voltage of 4.65 to 5.65 volts would be needed at node 101 to turn-on Q2. Thus, when Q10 is turned-on, unwanted signals at node 101 are significantly attenuated and will generally not have sufficient amplitude to disturb the preexisting voltage at node 92. Furthermore, even if the voltage at node 92 is increased somewhat, the disturbing voltage may not have sufficient amplitude to cause Q6 and/or Q8 to conduct.

The blanking circuit 108 thus functions to minimize or inhibit signals appearing at SUMY during vertical blanking intervals. At times other than the vertical blanking interval, the blanking circuit does not load down the circuit and has virtually no effect (except for some negligible capacitive loading) on the operation of the autopix loop.

Note that since the output signal of the peak detector at nodes 92 and 103 decays very slowly, "blanking" the input to the detector during the vertical blanking intervals which last for 1.27 milliseconds, has no significant effect on the value of the output of the detector. Thus, with the blanking circuit 108 in the circuit, the signals along the feedback loop will tend to maintain the level they had prior to the vertical blanking interval during that period. It should thus be appreciated that by "blanking" the input to detector stage 100 rather than some other points, the loop remains essentially static while unwanted signals are inhibited from propagating through the loop. However, it should be appreciated that the "blanking" signal may be coupled to other points of the loop to effectuate the desired results.

The invention has been illustrated using certain circuit configurations and bipolar transistors. It should be evident that the invention may be practiced using differently configured peak detectors and comparators and transistors of different types and conductivity [e.g., metal oxide semiconductor (MOS) transistors].

The invention has been illustrated for "blanking" during vertical blanking. However, it should be appreciated that the blanking circuit 108 of the invention could also be used and activated during horizontal blanking periods by applying horizontal blanking signals to blanking circuit 108.

What is claimed is:

1. In a TV system which includes a contrast control section coupled to a brightness control section and wherein the contrast control and brightness control sections are responsive to red (r), green (g) and blue (b) color signals and wherein the TV system also includes means for combining outputs of the brightness control section to produce a "combined signal" representative of the luminance component of the image to be displayed, and wherein the "combined signal" is coupled via a control loop to the contrast control section for controlling its response to the r, g, and b color signals, the improvement comprising:
    selectively enabled means, coupled to the control loop, responsive to a vertical blanking signal having a first value during vertical blanking intervals for limiting the propagation of the "combined signal" via the control loop during vertical blanking intervals.

2. In the TV system of claim 1, wherein said control loop includes a peak detector and a comparator with said combined signal being applied to the input of said peak detector and the output of the peak detector being coupled to the input of said comparator and the output of said comparator being coupled to said contrast control section, and wherein said means coupled to the control loop includes means coupled to said peak detector for limiting the response of said peak detector during said vertical blanking interval.

3. In the TV system of claim 2, wherein said peak detector includes a first transistor having a base and an emitter, and wherein a signal responsive to the combined signal is applied to the base of said first transistor and a signal whose amplitude corresponds to said combined signal is produced at the emitter of said first transistor, and wherein the means coupled to the peak detector includes a shunt transistor having its conduction path connected between the base of said first transistor and a point of relatively fixed potential for diverting a portion of the combined signal from being supplied to and amplified by said first transistor during a vertical blanking interval.

4. In the TV system of claim 3, wherein said shunt transistor has a base to which is applied said vertical blanking signal and wherein the conduction path of said shunt transistor is connected between the base of said first transistor and a resistive network.

5. A TV system comprising:
    a contrast control section and a brightness control section; each one of said contrast and brightness control sections having inputs and outputs;
    means coupling outputs of the contrast control section to inputs of the brightness control section;
    means adapted to receive red (r), green (g) and blue (b) color signals including means for applying said r, g and b color signals to inputs of said contrast control section for processing said r, g and b color signals via said contrast and brightness control sections;
    combining means coupled to outputs of the brightness control section for combining said outputs of said brightness control section and producing a combined signal;
    a feedback loop responsive to said combined signal coupled between said combining means and said contrast control section;
    a blanking signal having a first value during blanking intervals and a second value at times other than said blanking intervals; and
    selectively enabled means coupled to said feedback loop, responsive to said first value of said blanking signal, for limiting the propagation of said combined signal via said feedback loop during said blanking intervals.

6. The TV system as claimed in claim 5 wherein said blanking signal is a vertical blanking signal.

7. The TV system of claim 6, wherein said feedback loop includes a peak detector and a comparator with said peak detector having an input to which is applied said combined signal and said peak detector having an output coupled to an input of said comparator and said comparator having an output coupled to said contrast control section; and wherein said selectively enabled means coupled to the feedback loop includes means coupled to said peak detector for limiting the response of said peak detector during said blanking interval.

8. In the TV system of claim 7, wherein said peak detector includes a first transistor having a base and an emitter, and wherein a signal responsive to the combined signal is applied via a first resistive means to the base of said first transistor and a signal whose amplitude corresponds to said combined signal is produced at the emitter of said first transistor, and wherein the means coupled to the peak detector includes a shunting transistor having its conduction path connected between the base of said first transistor and a point of relatively fixed potential for shunting and attenuating a portion of the combined signal applied to the base of said first transistor.

9. In the TV system of claim 8, wherein said shunting transistor has a base to which is applied said vertical blanking signal and wherein the conduction path of said shunt transistor is connected between the base of said first transistor and a resistive network.

10. In the TV system as claimed in claim 9 wherein the combination of said first resistive means and said resistive network functions to attenuate the combined signal applied to the base of said first transistor.

* * * * *